Nov. 2, 1965 CHAN REN CHING 3,215,381
TABLE LEG MEANS FOR SUPPORTING A BEACH-PARASOL
Filed Aug. 29, 1963 2 Sheets-Sheet 1

Chan Ren Ching
INVENTOR.

BY Michael J. Striker

Nov. 2, 1965 CHAN REN CHING 3,215,381
TABLE LEG MEANS FOR SUPPORTING A BEACH-PARASOL
Filed Aug. 29, 1963 2 Sheets-Sheet 2
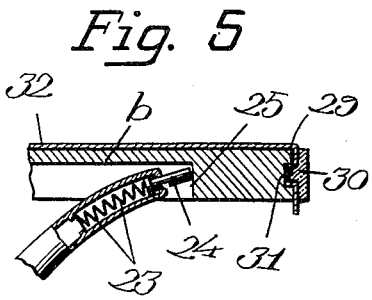
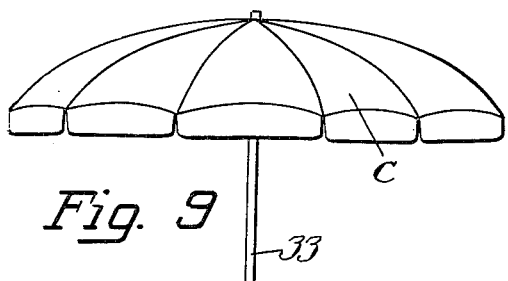
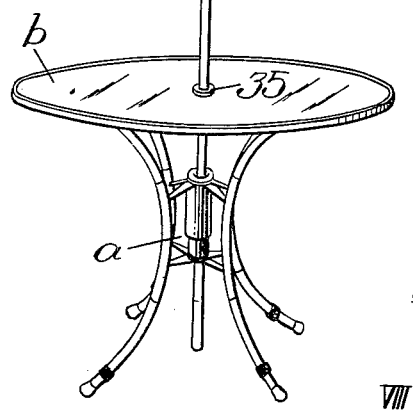
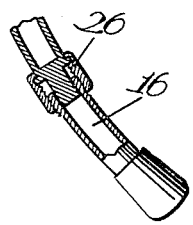
Chan Ren Ching
INVENTOR.
BY Michael J. Striker

United States Patent Office 3,215,381
Patented Nov. 2, 1965

3,215,381
TABLE LEG MEANS FOR SUPPORTING
A BEACH-PARASOL
Chan Ren Ching, 1 1-chome, Shin Yamashita-machi,
Yokohama, Kanagawa Prefecture, Japan
Filed Aug. 29, 1963, Ser. No. 305,392
Claims priority, application Japan, July 10, 1963,
38/35,374
9 Claims. (Cl. 248—167)

The present invention relates to a support means for a beach parasol.

An object of the invention is to provide a support means upon which any type of beach parasol can be placed with full freedom of upward and downward adjustment.

Also, another object of the invention is to provide such a means of the type in which a group of support legs comprises three or more paired leg extensions which are curved outward at both ends, and also the legs are separable so that they may be easily carred anywhere.

Still another object of the invention is to provide such a means of the type wherein at the center of a table surface, the shape of which can be varied, an opening is provided through which a beach parasol stem may be inserted into a center support connected with said supporting leg and aligned with the opening.

Furthermore, still another object of the invention is to provide such a means to which said table is firmly secured by link members with springs therein, said link members being secured to the curved upper portion of said supporting legs so as to engage said table with spring action.

Now taking into consideration the objects above mentioned and other objects to be below mentioned, further detailed explanations on the arrangement of each portion will be given in the following description and in the claims attached hereto.

In the accompanying drawings the invention is shown by way of various embodiments:

FIG. 5 is a partial section through the principal portion of an embodiment in which the link between upper leg extension and table is clearly shown;

FIG. 6 is also a partial section of the important portion which shows the minute controlling-system in the lower leg extension;

FIG. 7 is a plan view of the upper cross bearing-rod of said curved support legs;

FIG. 8 is a section along the line VIII—VIII of FIG. 7; and

FIG. 9 shows a perspective view of the inventive device in actual use.

Figure 1:
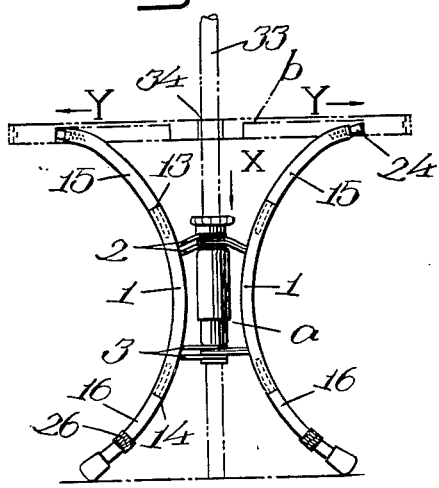
FIG. 1 is a side elevational view of the support means upon which a beach parasol can be placed.
Figure 2:
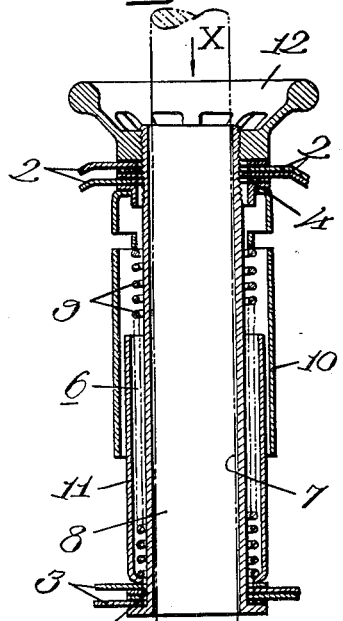
FIG. 2 is a magnified section through the embodiment of FIG. 1.
Figure 3:
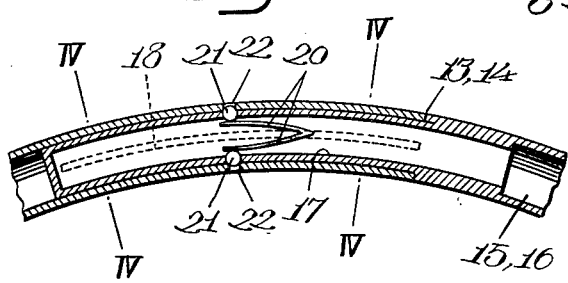
FIG. 3 shows a magnified section through the principal portion of an embodiment and shows connection between curved supporting legs and upper and lower leg extensions.
Figure 4:
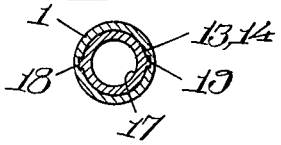
FIG. 4 is a section along the line IV—IV of FIG. 3.

In the drawings, reference numeral 1 represents a group of three or four or more outwardly curved support legs, to each of the upper and lower portions of which a pair of stacked cross bearing-rods 2, 3 is fitted to project inward at right angles.

A pair of upper and lower bores 4, 5 is provided intermediate the middle and the lower end of each of said curved supporting legs 1, and the rods 2, 3 are inserted through the bores in the various legs 1 and into a central pipe 8, which has a central bore 7, and which is in turn received in pipe body 6.

Intermediate each pair of said upper and lower rods 2, 3, there are provided respective outer and inner pipe cases 10, 11, the latter being received in the former and coil springs 9 being disposed between them.

The coil springs are increased in tension by screw-threaded metal fittings 12 used to hold said rods 2, 3 at each end of the pipe 8; this imparts considerable stability to each curved supporting leg 1.

Thus formation of a core unit $a$ is achieved.

In this embodiment, each supporting leg 1 of said core unit $a$ may also be replaced by a long jointless one.

As shown in the drawings, the supporting legs of the embodiment are short and are each provided with upper and lower inserting holes 13, 14 into which the upper and lower separable leg extensions 15 and 16 are inserted.

Thus the device can be disassembled freely at any time.

In addition, for further adjustment of the upper and lower leg extensions 15, 16, a suspending slot 18, or an engaging projection 19 matching with said slot 18, is provided either in inserting holes 13, 14 or in the inserting portion 17 of said legs 15, 16.

Also, each supporting-leg unit is provided with a pair of balls 21 which are positioned in bores in the inserting portions 17 and are urged outwardly by a spring 20, thus firmly maintaining the position of said legs 15, 16 by snapping into the corresponding holes 22 of said supporting leg 1.

On the other hand link member 24 with its associated spring 23 is fitted to the upper end of said leg 15.

The member 24 enables engagement of said upper leg 15 with table $b$ by direct elastic connection with the suspending portion 25 of the table. To permit slight length adjustments of the leg 16 the latter is provided at its lower portion with a ring 26 to facilitate rotational adjustment.

The upper cross bearing rod 2 of said curved supporting leg 1, which is a structural member of core unit $a$, is made of an elastic metal plate, and is tightly fixed by screw-type metal fittings so as to act on the upper part of said supporting leg 1 and make it extend outward by forcing the normally slightly elevated end of the rod 2 itself which is connected to core unit $a$ to move downward, that is, toward X shown by the arrow so that its other end will move radially outwardly.

Thus, upper leg extension 15 is forced to move outwardly as shown at Y.

The surrounding edge of upper bore 4 provided at the top of said bearing rod 2 is formed with projection 27 and cutout portion 28 as shown in the drawing in such a manner that the projections 27 of the stacked rods 2 are displaced by 90 degrees relative to each other when said supporting leg 1 comprises four of the rods 2, and the cutout 28 is made precisely to engage with the respective complementary projection.

In each pair, when the top pairs of upper rods 2 are extended one after the other to place them in operative position, the projection 27 of the lower rod is arranged to engage with the cutout portion 28 of the upper rod.

In other words, said paired rods 2 are so arranged as to interlock when they are displaced relative to one another through 90 degrees.

Thus, through engagement between projection 27 of the paired rods 2 and said cutout portions 28, each curved supporting leg 1 is positioned with precise, equal spacing without the need for measuring the distances between four united support legs.

Thus, assuming that the support means consists of four support legs, it is definable that the distance between the above-mentioned projection 27 and portion 28 is "$360°/n$," where both 27, 28 are formed around the edge of said rod 2 and hole 4.

The edge of table $b$ is fitted along the ring groove 31 with a rubber or plastic ring pad 30 having a projection 29 inside, so that the table-edge is protected against any damage in folded transportation; also, the provision of pad 30 assures that it naturally acts as a bumper in collision with other things, and the hem of a tablecloth 32 placed over the table-surface can be easily held between said ring pad 30 and the table-edge.

An inserting hole 34 is punched through at the center of said table, so that the stem 33 of a beach parasol *c* may be inserted through it.

Then packing 35 is fixed at the hole 34 to support and cushion said stem 33.

The hole 34 is then aligned with the center pipe body 8.

Beach parasol *c* can now be set up by inserting stem 33 into the pit 7.

According to this invention the present device has upper and lower leg extensions 15, 16 which are freely secured to, and removed from each curved supporting leg 1 of core unit *a*, the latter being in turn separable at will from the legs 1, and a beach parasol *c* can be secured to the supporting means assembled from these parts and is freely removable from, and adjustable on, said supporting means.

Thus this device can be easily disassembled into small sections.

To assemble the inventive device requires the following steps:

First of all, said bearing rods 2, 3 of each curved leg 1 belonging to said core unit *a* are extended one after the other radially of said center pipe body 8.

Next, upper and lower leg extensions 15, 16 are fitted to the respective ends of said curved supporting legs 1.

Further, table *b* is disposed on the assembly in such a way as to be engaged by the link members 24 of upper legs 15.

Once this is done, the upper bearing rod 2 is pushed in the direction of the arrow X by manipulation of screw-threaded metal fittings 12 of core unit *a*, whereby the upper legs 15 are opened and extended outward in the direction indicated by arrows Y to increase further the stability of engagement between said member 24 and table *b*.

Last, the combination is completed by inserting the stem 33 of parasol *c* through the inserting hole 34 of table *b* into the center pit 7 of center pipe body 8 retained by core unit *a*.

Thus the assembly, as will be understood, is very simple, so that the device is quickly set up at any place without experience or skill.

Especially owners on a hiking or pleasure tour will find the device convenient to bring along for outdoor uses.

Also, the shape of said table *b* can be any one of various types, e.g., circle, ellipse, and square, because the only provision required for use with the inventive device is suspending portion 25 which cooperates with said member 24 within the upper leg 15 of core unit *a*.

If the table *b* is elongated it is supported by providing several of the support means suggested by this invention.

The inventive device has the following advantages.

Since the whole device can be knocked down into small sections, which makes it convenient for transport, and since a beach parasol can be supported on it at will, it offers the user comfort by sheltering him from the direct rays of the sun when outdoors.

It is suitable for use during hot seasons of summer or in the tropics.

And it provides a pleasing appearance because its supporting legs and upper and lower leg extensions have arc-like curves to match the rounded shape of the parasol supported on the device.

A further feature is that knees and feet of persons sitting about the table hardly touch the table legs and supporters because of the curved configuration, so that the table can be used without limiting such persons' positions and as a result without any inconvenience.

In the above I have only described one possible embodiment of the present invention.

It is obvious that the present invention is not limited by the embodiment above mentioned, and that the present invention includes all the structures as defined in the following claims.

I claim:

1. In a folding table, in combination, a plurality of leg means located angularly spaced from each other about a vertical axis; a table top removably placed on upper ends of said leg means and having abutment face portions facing said axis and being adapted to be engaged by said upper ends of said leg means; connecting means downwardly spaced from said table top and connecting said leg means to each other at portions thereof downwardly spaced from said upper ends and at a fixed distance from said axis; and adjustable spreading means axially spaced from said connecting means and operatively connected to said leg means for spreading said upper ends thereof apart and in tight engagement with said abutment face portions so as to hold said table top on said upper ends of said leg means.

2. In a folding table, in combination, a plurality of leg means located angularly spaced from each other about a vertical axis and having outwardly curved upper ends facing away from said axis; a table top removably placed on said outwardly curved upper ends of said leg means and having abutment face portions facing said axis and being adapted to be engaged by said upper ends of said leg means; connecting means downwardly spaced from said table top and connecting said leg means to each other at portions thereof downwardly spaced from said upper ends and at a fixed distance from said axis; and adjustable spreading means intermediate said table top and said connecting means and operatively connected to said leg means for spreading said upper ends thereof apart and in tight engagement with said abutment face portions so as to hold said table top on said upper ends of said leg means.

3. In a folding table, in combination, a plurality of curved leg means located angularly spaced from each other about a vertical axis and each having upper and lower outwardly directed ends spaced further from said axis than an intermediate portion of said leg means between said ends; a table top removably placed on said upper outwardly directed ends of said leg means and having abutment face portions facing and adapted to be engaged by said upper outwardly directed ends of said leg means; connecting means connecting said leg means to each other in the region of the intermediate portions thereof at a fixed distance from said axis; and adjustable spreading means intermediate said table top and said connecting means for spreading said upper ends apart and in tight engagement with said abutment face portions so as to hold said table top on said upper ends of said leg means.

4. In a folding table, in combination, a plurality of leg means located angularly spaced from each other about a vertical axis and having outwardly curved upper ends facing away from said axis; a table top removably placed on said outwardly curved upper ends of said leg means and having abutment face portions facing said axis and being adapted to be engaged by said upper ends of said leg means; connecting means downwardly spaced from said table top and connecting said leg means to each other at portions thereof downwardly spaced from said upper ends and at a fixed distance from said axis; and adjustable spreading means intermediate said table top and said connecting means and operatively connected to said leg means for spreading said upper ends thereof apart and in tight engagement with said abutment face portions so as to hold said table top on said upper ends of said leg means, said adjustable spreading means including a plurality of arms connected at the outer ends thereof to said leg means, respectively, and having inner ends connected to each other in the region of said axis and being movable from a position inclined to said axis at an angle of less than 90° to a spreading position substantially normal to said axis, and adjustable means engaging said inner ends of said arms for changing the position of said arms from said inclined to said spreading position.

5. In a folding table, in combination, a plurality of leg means located angularly spaced from each other about a vertical axis and having outwardly curved upper ends facing away from said axis; a table top removably placed on said outwardly curved upper ends of said leg means and having abutment face portions facing said axis and being adapted to be engaged by said upper ends of said leg means; a first plurality of flat metal straps respectively connected at outer ends thereof to said leg means and each extending from said outer end radially inward towards said axis and being formed at the inner end thereof with an axial bore, said straps of said first plurality of straps being superimposed upon each other at their inner ends with said bores aligned with each other along said axis; a second plurality of flat flexible metal straps respectively connected at outer ends thereof to said leg means at portions thereof upwardly spaced from said first plurality of metal straps and each extending from said outer end radially inward towards said axis and upwardly inclined to said axis at an angle of less than 90°, and each being formed at the inner ends thereof with an axial bore, said straps of said second plurality of straps being superimposed upon each other at their inner ends with said bores aligned with each other along said axis; an elongated member extending along said axis through said aligned bores of said first and second plurality of straps for connecting said first and second plurality of straps respectively to each other turnably about said axis; fixed abutment means on the lower end of said elongated member and abutting against the lowermost of said first plurality of straps; and adjustable abutment means operatively connected to the upper end of said elongated member adjustable in axial direction thereof and abutting against the uppermost of the straps of said second plurality of straps to change the inclination thereof for spreading said upper ends of said leg means apart and in tight engagement with said abutment face portions so as to hold said table top on said upper ends of said leg means.

6. In a folding table, in combination, a plurality of leg means located angularly spaced from each other about a vertical axis and having outwardly curved upper ends facing away from said axis; a table top removably placed on said outwardly curved upper ends of said leg means and having abutment face portions facing said axis and being adapted to be engaged by said upper ends of said leg means; a first plurality of flat metal straps respectively connected at outer ends thereof to said leg means and each extending from said outer end radially inward towards said axis and being formed at the inner end thereof with an axial bore, said straps of said first plurality of straps being superimposed upon each other at their inner ends with said bores aligned with each other along said axis; a second plurality of flat flexible metal straps respectively connected at outer ends thereof to said leg means at portions thereof upwardly spaced from said first plurality of metal straps and each extending from said outer end radially inward towards said axis and upwardly inclined to said axis at an angle of less than 90°, and each being formed at the inner ends thereof with an axial bore, said straps of said second plurality of straps being superimposed upon each other at their inner ends with said bores aligned with each other along said axis; an elongated member extending along said axis through said aligned bores of said first and second plurality of straps for connecting said first and second plurality of straps respectively to each other turnably about said axis; fixed abutment means on the lower end of said elongated member and abutting against the lowermost of said first plurality of straps; adjustable abutment means operatively connected to the upper end of said elongated member adjustable in axial direction thereof and abutting against the uppermost of the straps of said second plurality of straps to change the inclination thereof for spreading said upper ends of said leg means apart and in tight engagement with said abutment face portions so as to hold said table top on said upper ends of said leg means; and resilient means between the uppermost of said first plurality of straps and the lowermost of said second plurality of straps for pressing said first plurality of straps against said fixed abutment means and said second plurality of straps against said adjustable abutment means.

7. A folding table as set forth in claim 6 wherein said elongated member is formed at the upper end thereof with a screw thread and wherein said adjustable abutment means is in the form of a nut threadingly engaging said screw thread.

8. A folding table as set forth in claim 7 wherein said elongated member is a tubular member and wherein said table top is formed with a central opening aligned with the axis of said tubular member so that the stem of a beach umbrella may be inserted through said opening and said tubular member so as to be held therein.

9. A folding table as set forth in claim 5 wherein each of said straps of at least one of said plurality of straps is formed in the region of said bore with a male and a female engaging means angularly spaced from each other so that the male engaging means of one strap may engage in the female engaging means of the strap superimposed thereto to hold said straps at a preselected angle with respect to each other.

References Cited by the Examiner

UNITED STATES PATENTS

| | | | |
|---|---|---|---|
| 1,306,666 | 6/19 | Houston | 108—139 |
| 1,697,094 | 1/29 | Turk | 108—157 |
| 2,777,692 | 1/57 | Marzucca | 248—414 |

CLAUDE A. LE ROY, *Primary Examiner.*